United States Patent
Shibata et al.

(10) Patent No.: US 7,873,262 B2
(45) Date of Patent: Jan. 18, 2011

(54) DATA PROCESSING METHOD, DEVICE THEREOF AND PROGRAM

(75) Inventors: Yoshiaki Shibata, Kanagawa (JP); Mitsutoshi Shinkai, Kanagawa (JP)

(73) Assignee: Sony Corporation, Tokyo (JP)

(*) Notice: Subject to any disclaimer, the term of this patent is extended or adjusted under 35 U.S.C. 154(b) by 1087 days.

(21) Appl. No.: 10/512,827

(22) PCT Filed: Apr. 2, 2004

(86) PCT No.: PCT/JP2004/004837
§ 371 (c)(1),
(2), (4) Date: Oct. 28, 2004

(87) PCT Pub. No.: WO2004/090896
PCT Pub. Date: Oct. 21, 2004

(65) Prior Publication Data
US 2005/0226600 A1    Oct. 13, 2005

(30) Foreign Application Priority Data
Apr. 4, 2003    (JP) .............................. 2003-102158

(51) Int. Cl.
*H04N 5/76* (2006.01)
*H04N 5/00* (2006.01)

(52) U.S. Cl. ........................... 386/69; 386/95; 386/125; 386/126

(58) Field of Classification Search .................. 386/83, 386/95, 125, 126
See application file for complete search history.

(56) References Cited

U.S. PATENT DOCUMENTS 5,488,409 A * 1/1996 Yuen et al. .................... 725/41
5,546,191 A * 8/1996 Hibi et al. ..................... 386/83
5,576,950 A * 11/1996 Tonomura et al. ........... 386/121
5,727,060 A * 3/1998 Young ......................... 348/734
5,734,788 A * 3/1998 Nonomura et al. .......... 386/126
6,091,884 A * 7/2000 Yuen et al. .................... 386/83
6,182,111 B1 * 1/2001 Inohara et al. ............... 709/201
6,195,650 B1   2/2001 Gaither et al.
6,201,928 B1 * 3/2001 Nonomura et al. ........... 386/68
6,795,641 B2 * 9/2004 Okada et al. .................. 386/95
6,799,180 B1 * 9/2004 McGrath et al. ............. 707/100
6,868,226 B1 * 3/2005 Kwoh et al. ................... 386/95
6,970,639 B1 * 11/2005 McGrath et al. .............. 386/52

(Continued)

FOREIGN PATENT DOCUMENTS

GB    2312078    * 10/1997

(Continued)

OTHER PUBLICATIONS

International Search Report dated Jul. 29, 2003.

*Primary Examiner*—Peter-Anthony Pappas
*Assistant Examiner*—Gelek Topgyal
(74) *Attorney, Agent, or Firm*—Rader, Fishman & Grauer PLLC

(57) ABSTRACT

An optical disk device 4 for acquiring a file path to an AV file data corresponding to a designated data UMID in an optical disk, based on management data MD read out from the optical disk, in response to a request REQ from a computer 3 and further accessing AV file data recorded at a physical address acquired based on the file path.

10 Claims, 9 Drawing Sheets

U.S. PATENT DOCUMENTS

| | | | |
|---|---|---|---|
| 7,123,816 B2 * | 10/2006 | McGrath et al. | 386/95 |
| 7,212,730 B2 * | 5/2007 | Boston et al. | 386/83 |
| 7,248,776 B2 * | 7/2007 | Boston et al. | 386/46 |
| 7,289,717 B1 * | 10/2007 | McGrath et al. | 386/52 |
| 2002/0051641 A1 | 5/2002 | Nagaoka | |

FOREIGN PATENT DOCUMENTS

| | | |
|---|---|---|
| JP | 63-255889 | 10/1988 |
| JP | 02-032430 | 2/1990 |
| JP | 2000-207261 | 7/2000 |
| JP | 2001-229056 | 8/2001 |
| JP | 2002-135692 | 5/2002 |
| JP | 2002-297628 | 10/2002 |

* cited by examiner

FIG. 4

| UMID | FILE PATH |
|---|---|
| UMID__1 | FP__1 |
| UMID__2 | FP__2 |
| ⋮ | ⋮ |

| PHYSICAL ADDRESS | FILE PATH |
|---|---|
| PYSA__1 | FP__1 |
| PYSA__2 | FP__2 |
| ⋮ | ⋮ |

FAT

FSP

DATA PROCESSING METHOD, DEVICE THEREOF AND PROGRAM

TECHNICAL FIELD

The present invention relates to a data processing method for managing material data recorded on a recording medium and an apparatus of the same and a program of the same.

BACKGROUND ART

In the SMPTE (Society of Motion Picture and Television Engineers), as an identifier of an audio visual material (AV material), the UMID (Unique Material Identifier) has been standardized.

Under material management based on the UMID, a global unique UMID is added to each AV material, and the AV material is uniquely identified based on the UMID.

The above AV material is managed as a file in a file system of an OS (Operating System) of a computer, and a file name designating a file path is added. In the file system, for example, access to the file is realized based on a FAT (File Allocation Table) indicating correspondence between file paths and physical addresses on the recording medium recording the file therein.

In the above conventional system, however, for example, when an access request to the AV material designating a UMID arises, a means solving on which file path prescribed by the file system the access of the AV material is based (name solving means) has not been provided.

Due to this, there is the problem that even if the UMID is designated, the address on the recording medium recording the AV material having the UNID therein cannot be specified, so an access request to the AV material cannot be adequately processed.

DISCLOSURE OF THE INVENTION

The present invention was made in consideration with such a circumstance. An object thereof is to provide a data processing method capable of providing an access path to material data corresponding to designated identification data in response to a request designating identification data with respect to the recording medium recording the identification data for identifying each material data among the material data under predetermined material management and the material data linked together and an apparatus and a program of the same.

To attain the above object, the data processing method of the first aspect of the invention comprises a first step of reading management data indicating linked together identification data of material data recorded on the recording medium and the access path to the material data in said recording medium from said recording medium when a recording medium recording identification data for identifying each material data among material data under predetermined material management and said material data linked together is set at an access position and a second step of providing said access path to said material data corresponding to said designated identification data in said recording medium in response to the request designating said identification data, based on said management data read out in said first step.

The mode of operation of the data processing method of the first aspect of the invention becomes as follows.

First, at the first step, when the recording medium recording the identification data for identifying each material data among the material data under the predetermined material management and said material data linked together is set at the access position, the management data indicating linked together said identification data of said material data recorded on the recording medium and the access path to the material data in said recording medium is read out from said recording medium.

Next, at the second step, said access path to said material data corresponding to said designated identification data in said recording medium is provided in response to the request designating said identification data, based on said management data read out at said first step.

The data processing method of the second aspect of the invention is a data processing method executed by a computer based on an application program, a management program, and a file system program, comprising a first step by which said management program reads management data indicating linked together identification data of material data recorded on the recording medium and the access path to the material data in said recording medium from said recording medium when a recording medium recording identification data for identifying each material data among material data under predetermined material management and said material data linked together is set at an access position, a second step by which said application program issues a request designating said identification data to said management program; a third step by which said management program provides said access path to said material data corresponding to said designated identification data in said recording medium to said file system program in response to a request for designating said identification data, based on said management data read out at said first step, in response to said request received at said second step; and a fourth step by which said file system program accesses said material data stored at a physical address of said recording medium, based on said access path received at said third step.

The mode of operation of the data processing method of the second aspect of the invention becomes as follows.

First, at the first step, when the recording medium recording the identification data for identifying each material data among material data under the predetermined material management and said material data linked together is set at the access position, said management program reads out the management data indicating linked together said identification data of said material data recorded in the recording medium and the access path to the material data in said recording medium from said recording medium.

Thereafter, at the second step, said application program issues a request designating said identification data to said management program.

Next, at the third step, said management program provides said access path to said material data corresponding to said designated identification data in said recording medium to said file system program in response to the request designating said identification data, based on said material data read out at said first step in response to said request received at said second step.

Next, at the fourth step, said file system program accesses said material data stored at a physical address of said recording medium, based on said access path received at said third step.

According to a third aspect of the invention, there is provided a program for making a computer execute a first routine of reading management data indicating linked together identification data of material data recorded on the recording medium and the access path to the material data in said recording medium from said recording medium when a recording medium recording identification data for identifying each material data among material data under predetermined material management and said material data linked together is set at an access position and a second routine of providing said access path to said material data corresponding to said designated identification data in said recording medium in response to the request designating said identification data, based on said management data read out in said first routine.

According to a fourth aspect of the invention, there is provided a data management apparatus comprising a first means for reading management data indicating linked together identification data of material data recorded on the recording medium and the access path to the material data in said recording medium from said recording medium when a recording medium recording identification data for identifying each material data among material data under predetermined material management and said material data linked together is set at an access position and a second means of providing said access path to said material data corresponding to said designated identification data in said recording medium in response to the request designating said identification data, based on said management data read out in said first means.

The mode of operation of the data processing apparatus of the fourth aspect of the invention becomes as follows.

First, the first means reads out the management data indicating linked together said identification data of said material data recorded on the recording medium and the access path to the material data in said recording medium from said recording media when the recording media recording linked together the identification data for identifying each material data among the material data under predetermined material management and said material data is set at the access position.

Next, the second means provides said access path to said material data corresponding to said designated identification data in said recording medium, based on said management data read out by said first means, in response to a request designating said identification data.

BRIEF DESCRIPTION OF THE INVENTION

FIG. 4 is a view for explaining management data MD of the embodiment of the present invention.

FIG. 5 is a view for explaining a FAT used by a file system program of the embodiment of the present invention.

BEST MODE FOR WORKING THE INVENTION

Below, an explanation will be given of an AV (audio visual) system according to an embodiment of the present invention.

Figure 1:
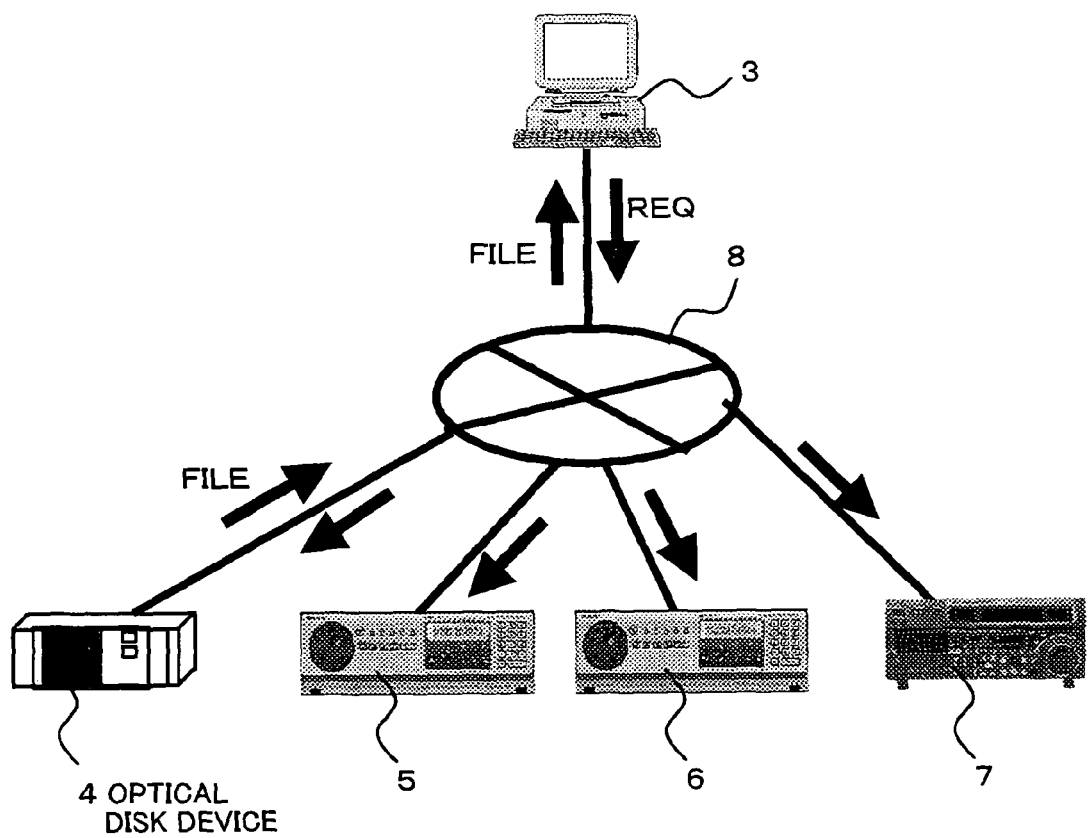
FIG. 1 is a view of the configuration of an AV system according to an embodiment of the present invention.

FIG. 1 is a view of the configuration of an AV system 1 according to the embodiment of the present invention.

As shown in FIG. 1, the AV system 1 has, for example a computer 3, an optical disk device 4, and AV apparatuses 5, 6, and 7 such as a VTR and editing apparatus. These are connected via a network 8.

In the AV system 1, for example, the optical disk device 4 reads out the management data MD (management data of the present invention, a so-called Index file) from the optical disk when the optical disk (recording medium of the present invention) recording linked together a UMID for uniquely identifying each AV file data among the AV file data under the management of the predetermined UMID and the AV file data is set (mounted) at the access position.

The management data MD shows linked together the data UMID of the AV file data and the file path to the AV file data (access path of the present invention) in the optical disk for each of the AV file data recorded on the optical disk.

In the AV system 1, for example, the computer 3 transmits a request REQ designating the data UMID to the optical disk device 4 and the AV apparatuses 5 to 7 via the network 8.

Then, the optical disk device 4 acquires the file path to the AV file data corresponding to the designated data UMID in the optical disk, based on the read out management data MD, in response to the request REQ and provides this to the file system of the OS operating on the optical disk device 4.

The file system obtains the physical address of the AV file data on the optical disk by referring to the FAT, based on the file path.

Then, the optical disk device 4 reads out the AV file data from the optical disk, based on the physical address and transmits the same to the computer 3 via the network 8.

In the AV apparatuses 5 to 7, for example, the same operation as that of the optical disk device 4 mentioned above is carried out.

Below, a detailed explanation will be given of the configuration of the optical disk device 4 shown in FIG. 1.

[Optical Disk Device 4]

Figure 2:
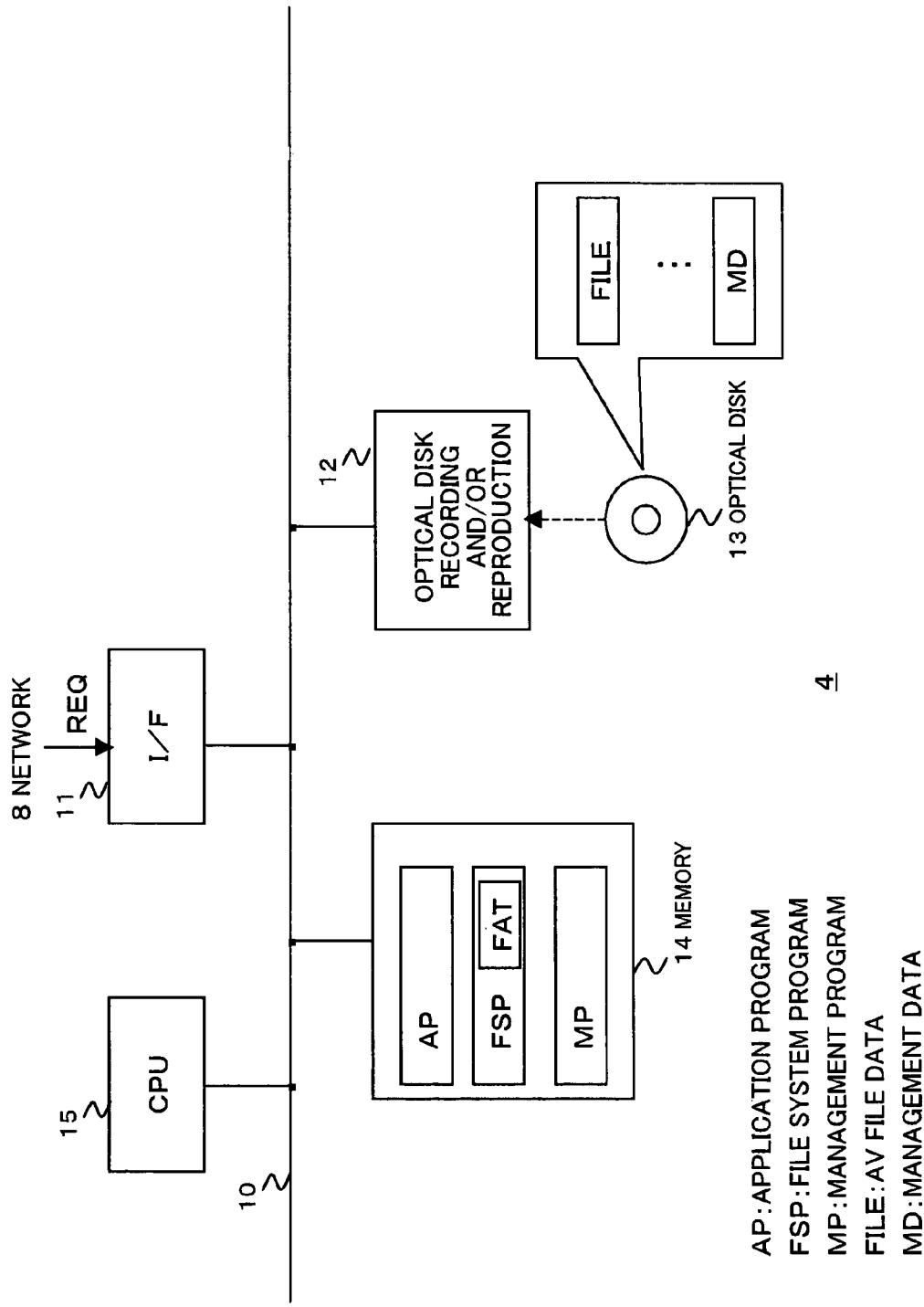
FIG. 2 is a block diagram of the functions of an optical disk device shown in FIG. 1.

FIG. 2 is a block diagram of the functions of the optical disk device 4 shown in FIG. 1.

As shown in FIG. 2, the optical disk device 4 has, for example, an interface 11, an optical disk recording and/or reproduction unit 12, a memory 14, and a CPU 15. These are connected via a bus 10.

The interface 11 is connected to the network 8 shown in FIG. 1, receives a request REQ from for example the computer 3 and, at the same time, transmits the AV file data read out from the optical disk 13 to the computer 3.

The optical disk recording and/or reproduction unit 12 accesses the optical disk 13 set at the access position in accordance with an instruction from the CPU 15 and performs the recording and/or reproduction thereof.

The optical disk recording and/or reproduction unit 12 notifies this to the CPU 15 when the optical disk 13 is set at the access position.

Further, the optical disk recording and/or reproduction unit 12 reads out the management data MD recorded in the optical disk recording and/or reproduction unit 12 in response to a request from the CPU 15. The management data MD will be explained in detail later.

Further, the optical disk recording and/or reproduction unit 12 reads out the AV file data FILE recorded on the optical disk 13 in response to a request from the CPU 15.

The memory 14 stores various data used for processing of the application program AP, the file system program FSP, the management program MP, and the CPU 15.

Here, the management program MP is a so-called material management routine and corresponds to the management program of the present invention.

Further, the application program AP corresponds to the application program of the present invention, while the file system program FSP corresponds to the file system program of the present invention.

The CPU 15 performs the processing based on the application program AP, the file system program FSP, and the management program MP which were read out from the memory 14.

The processing of the CPU 15 will be explained in relation to the example of operation explained later.

[AV File Data FILE]

Figure 3:
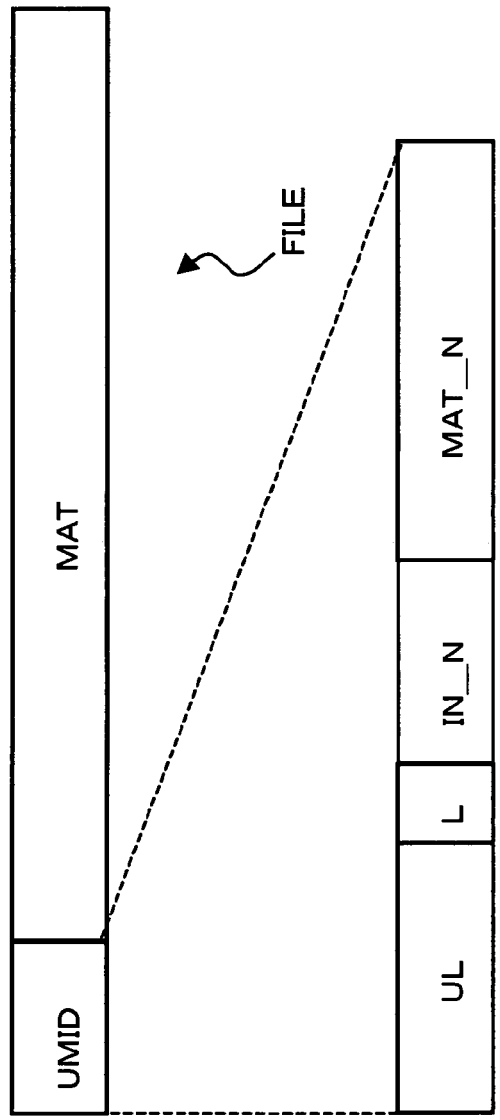
FIG. 3 is a view for explaining a format of an AV file data FILE of the embodiment of the present invention.

FIG. 3 is an example of the format of the AV file data FILE of the present embodiment.

As shown in FIG. 3, the AV file data FILE has the data UMID and the AV material data MAT.

Here, the data UMID corresponds to the identification data of the present invention, and the AV material data corresponds to the material data of the present invention.

The data UMID is data of 32 bytes having a universal label UL, a data length L, an instance number IN_N, and a material number MAT_N, based on the SMPTE standard.

The universal label UL is a unique identifier indicating that the byte train is UMID.

The data length is one byte continuing from the universal label UL, and the data length continuing from that is indicated by byte units.

The instance number IN_N is for example 3 bytes and indicates the property of the material number MAT_N continuing from that.

The material number MAT_N is for example 16 bytes and takes a global unique value.

The material number MAT_N is generated by combining a MAC address and the time when the material was generated using as a prerequisite the fact that the material (AV material) generated at a certain time is only one material at most since for example any network appliance is global uniquely identified by the MAC (Media Access Control) address.

[Management Data MD]

FIG. 4 is a view for explaining the format of the management data MD.

The management data MD is recorded on the optical disk 13, read out by the CPU 15, and updated in accordance with need.

As shown in FIG. 4, the management data MD indicates the data UMID of all AV file data FILE recorded in the memory 14 and the file paths thereof linked together.

Here, the file path indicates the recording position of the AV file data FILE by using one series of directory names used for indicating for example the position where the file data is recorded on the optical disk 13.

[FAT]

FIG. 5 is a view for explaining the FAT used by the file system program of the OS.

As shown in FIG. 5, the FAT indicates the physical address on the optical disk device 4 and the file path thereof linked together for each AV file data FILE.

Below, an explanation will be given of the application program AP, the file system program FSP, and the management program MP executed by the CPU 15 and the relationships of them.

Figure 6:
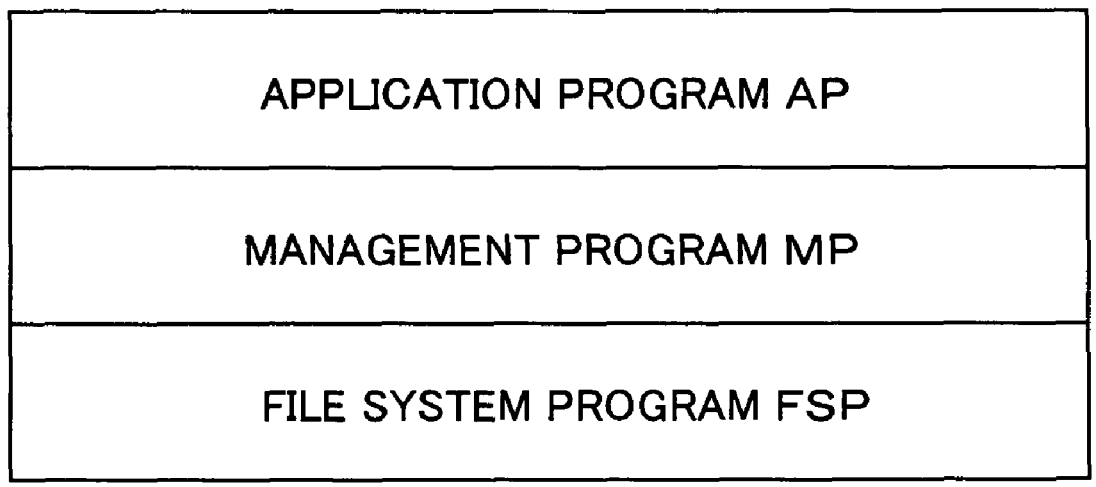
FIG. 6 is a view for explaining relationships among an application program AP, a file system program FSP, and a management program MP in the embodiment of the present invention.

FIG. 6 is a view showing these relationships.

As shown in FIG. 6, the management program MP (management layer) for realizing the name solution request of the UMID is positioned between the file system program FSP (file system layer) of the OS and the application program AP (application layer).

Below, an explanation will be given of an example of the operation of the optical disk device 4 of the present embodiment.

Note that the following processing is carried out by the CPU 15 or under control from the CPU 15, based on the application program AP, the management program MP, and the file system program FSP.

Example of First Operation

In the example of operation, an explanation will be given of the processing where the optical disk 13 is set in the optical disk device 4, and the optical disk device 4 receives the request REQ designating the UMID from the bus 10.

Figure 7A:
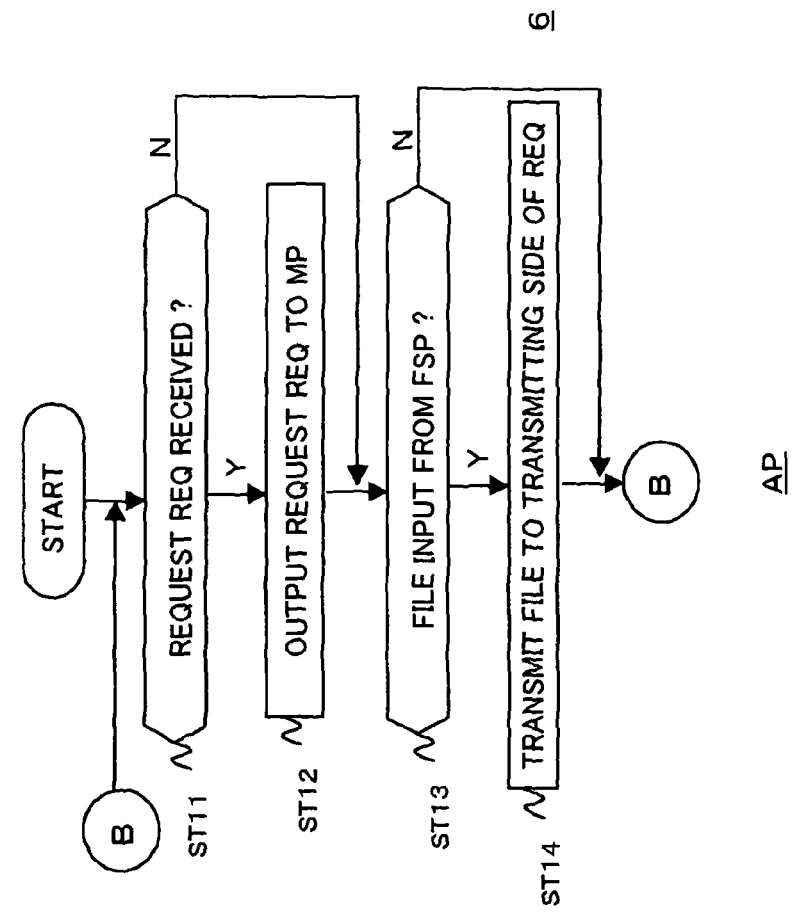
FIG. 7A is a flow chart for explaining processing by a management program MP in an example of the operation where the optical disk device shown in FIG. 1 receives a request REQ.
Figure 7B:
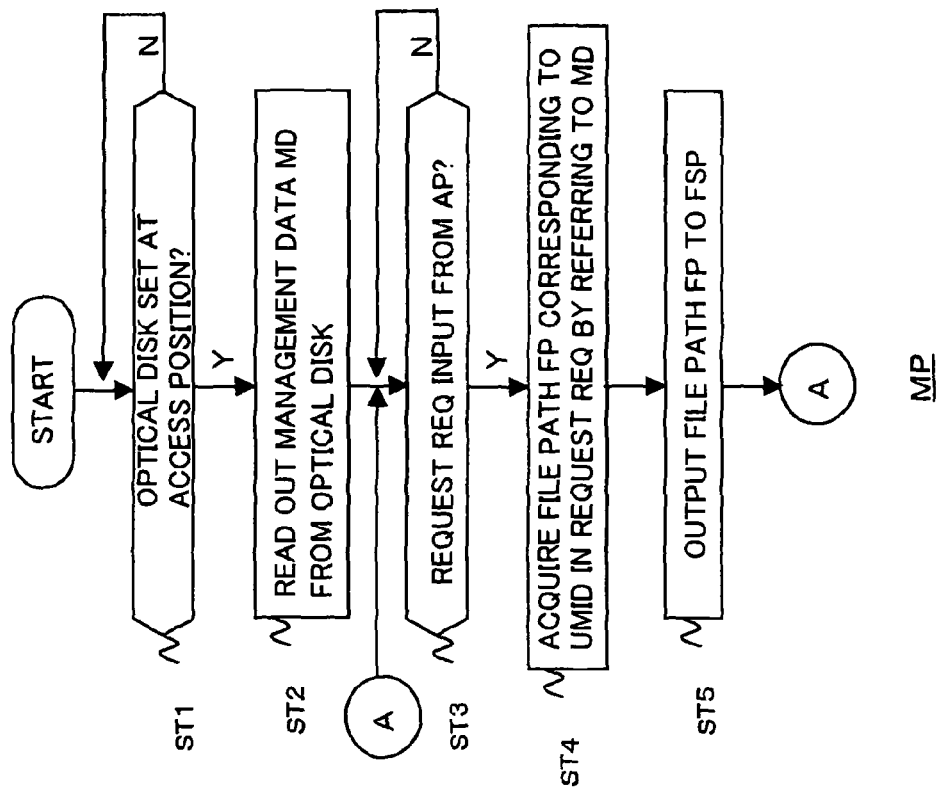
FIG. 7B is a flow chart for explaining processing by an application program AP in the example of the operation.

FIG. 7A is a flow chart for explaining the processing by the management program MP in the example of operation; FIG. 7B is a flow chart for explaining the processing by the application program AP in the example of operation; and FIG. 8 is a view for explaining the processing by the file system program FSP in the example of operation.

Here, steps ST1 and ST2 shown in FIG. 7A correspond to the first step of the first and second aspect of the inventions, and steps ST4 and 5 correspond to the second step of the first aspect of the invention and the third step of the second aspect of the invention.

Figure 8:
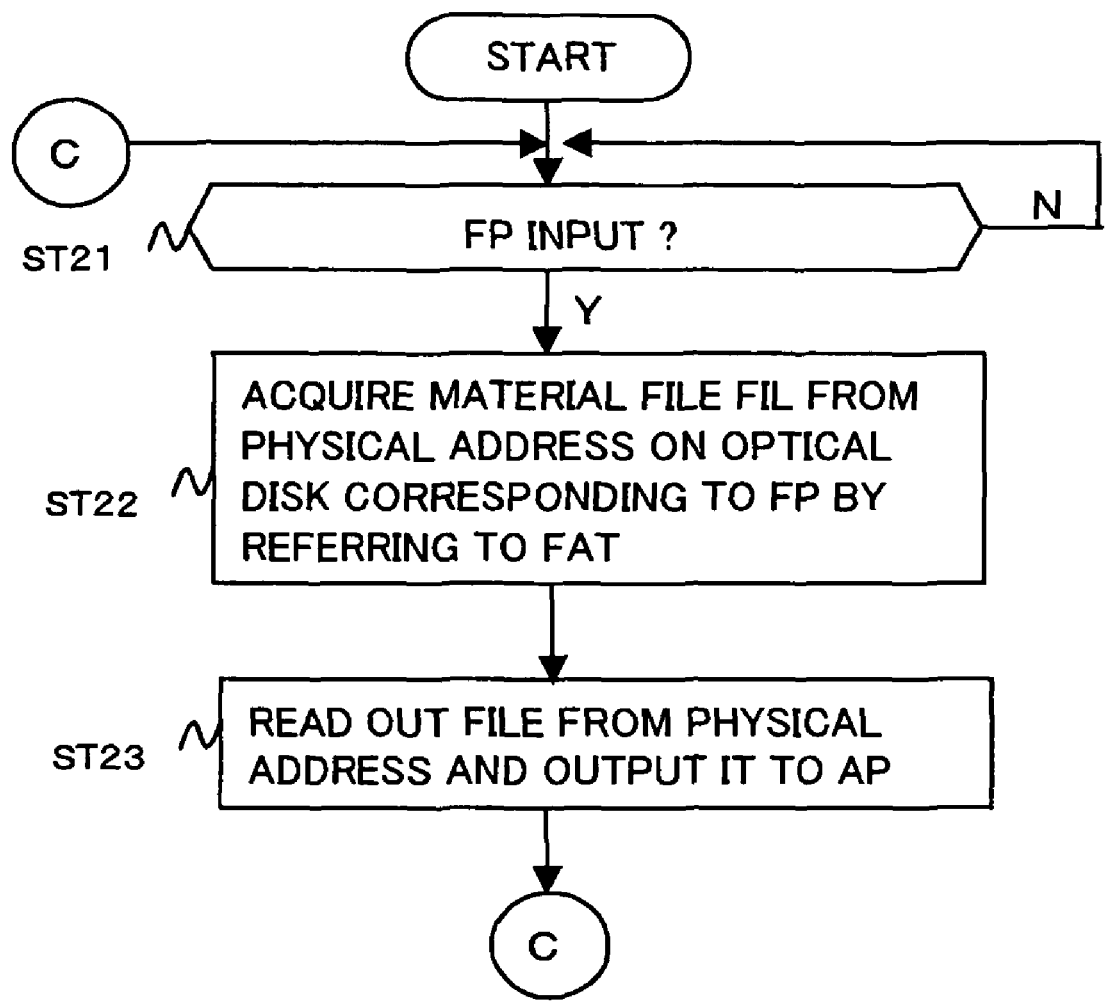
FIG. 8 is a flow chart for explaining processing by a file system program FSP when the optical disk device shown in FIG. 1 receives the request REQ.

Further, steps ST3 and ST11 shown in FIGS. 7A and 7B correspond to the second step of the second aspect of the invention, and step ST23 shown in FIG. 8 corresponds to the fourth step of the second aspect of the invention.

Further, the routines of steps shown in FIG. 7 and FIG. 8 are described in corresponding programs.

Further, the first means and the second means of the fourth invention are realized by the CPU 15 (computer of the present invention) executing steps ST1 and ST2 and steps ST4 and 5 shown in FIG. 7A.

Below, an explanation will be given of steps shown in FIG. 7.

First, an explanation will be given of steps of the processing of the CPU 15, based on the management program MP by using FIG. 7A.

Step ST1:

When the optical disk 13 is set at the access position of the optical disk recording and/or reproduction unit 12, a notification indicating this is output to the CPU 15.

The application program operating on the CPU 15 (hereinafter, simply referred to as the application program AP) outputs the information to the management program MP operating on the CPU 15 (hereinafter, simply referred to as the management program MP), based on the notification.

The management program MP is activated by for example the notification, the processing routine proceeds to the processing of step ST2, and when not so, a waiting state of the notification is held.

Step ST2:
The management program MP outputs a read instruction of the management data MD from the optical disk 13 to the optical disk 13.

By this, the optical disk recording and/or reproduction unit 12 reads out the management data MD from the optical disk 13 and outputs this to the CPU 15.

Step ST3:
The management program MP decides whether or not the request REQ designating the data UMID was input from the application program AP. When deciding so, the processing routine proceeds to the processing of step ST4. When not so, the processing of step ST3 is repeated.

Step ST4:
The management program MP acquires the file path FP corresponding to the data UMID designated by the request REQ input at step ST3 by referring to the management data MD shown in FIG. 4 input at step ST2.

Step ST5:
The management program MP outputs the file path FP acquired at step ST4 to the file system program FSP. Thereafter, the management program MP returns to the processing of step ST3.

Next, an explanation will be given of the processing of the CPU 15, based on the application program AP by using FIG. 7B.

Step ST11:
The application program AP decides whether or not the request REQ from the computer 3 was received via the interface 11. When deciding that the request REQ was received, the processing routine proceeds to the processing of step ST12. When not so, the processing routine proceeds to the processing of step ST13.

Step ST12:
The application program AP outputs the request REQ input at step ST11 to the management program MP.

Step ST13:
The application program AP decides whether or not the AV file data FILE was input from the file system program FSP. When deciding that this was input, the processing routine proceeds to the processing of step ST14. When not so, the processing routine returns to the processing of step ST11.

Step ST14:
The application program AP transmits the AV file data FILE input at step ST13 to the transmitting side of the request REQ, that is, the computer 3, via the interface 11.

Next, an explanation will be given of the steps of the processing of the CPU 15 based on the file system program FSP by using FIG. 8.

Step ST21:
The file system program FSP decides whether or not the file path FP corresponding to the data UMID was input from the management program MP. When deciding that the file path FP was input, the processing routine proceeds to the processing of step ST22. When not so, the processing of step ST21 is repeated.

Step ST22:
The file system program FSP acquires the physical address corresponding to the file path FP input at step ST21 by referring to the FAT shown in FIG. 5.

Step ST23:
The file system program FSP reads out the AV file data FILE from the physical address on the optical disk 13 acquired at step ST22 and outputs this to the AV file data FILE.

Example of Second Operation

Figure 9A:
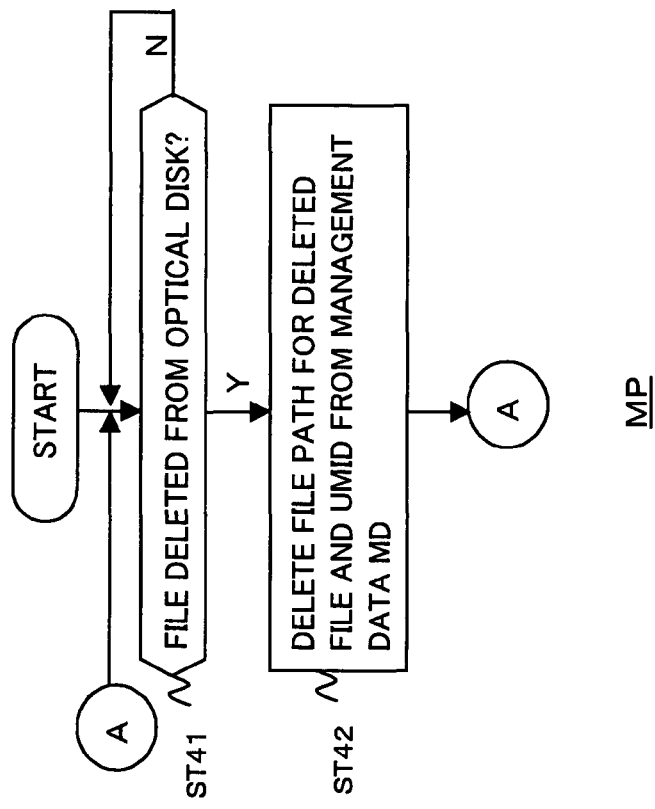
FIG. 9A is a flow chart for explaining processing by the management program MP when a new AV file data FILE is recorded on the optical disk shown in FIG. 2.

FIG. 9A is a flow chart for explaining the processing by the management program MP where a new AV file data FILE was recorded on the optical disk 13.

The CPU 15 generates the data UMID of the AV file data FILE when writing a new AV file data FILE to the optical disk 13, controls the optical disk recording and/or reproduction unit 12, and writes the generated data UMID and AV file data FILE to the optical disk 13 linked together.

Step ST31:
The management program MP decides whether or not the new AV file data FILE is written (recorded) to the optical disk 13. When deciding that this is written, the processing routine proceeds to the processing of step ST32. When not so, the processing of step ST31 is repeated.

Step ST32:
The management program MP adds the data bringing the file path FP of the decided AV file data FILE and the data UMID into correspondence to the management data MD shown in FIG. 4 when written at step ST31.

Thereafter, the management program MP returns to the processing of step ST31.

Third Example of Operation

Figure 9B:
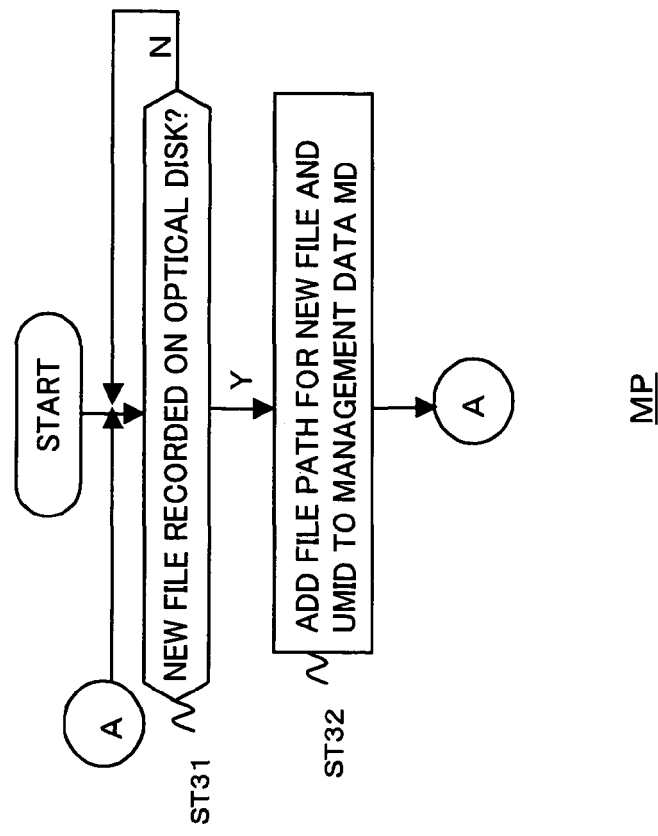
FIG. 9B is a flow chart for explaining the processing by the management program MP when the AV file data FILE is deleted from the optical disk.

FIG. 9B is a flow chart for explaining the processing by the management program MP when the AV file data FILE is deleted from the optical disk 13.

Step ST41:
The management program MP decides whether or not the recording of the AV file data FILE was deleted from the optical disk 13. When deciding that this was deleted, the processing routine proceeds to the processing of step ST42. When not so, the processing of step ST41 is repeated.

Step ST42:
The management program MP deletes the data bringing the file path FP of the AV file data FILE decided to be deleted at step ST41 and the data UMID into correspondence from the management data MD shown in FIG. 4.

Thereafter, the management program MP returns to the processing of step ST41.

Example of Fourth Operation

Figure 10B:
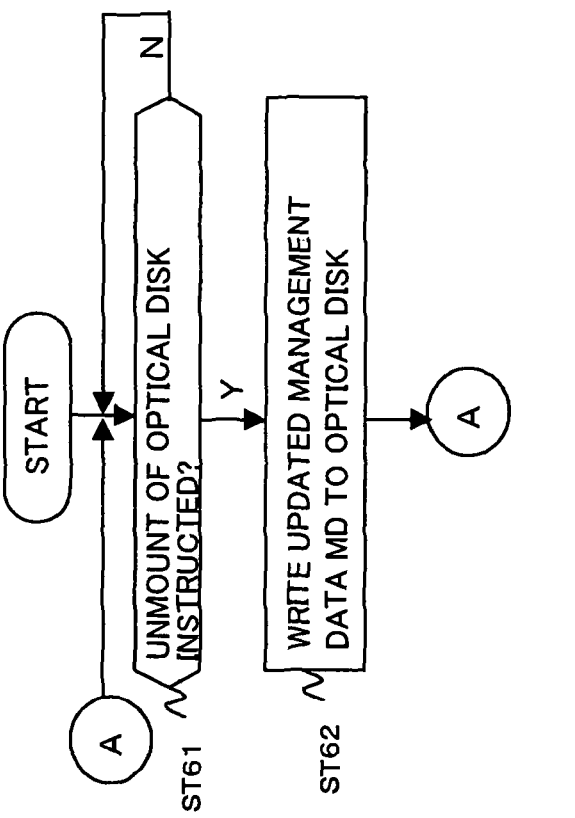
FIG. 10B is a flow chart for explaining the processing by the management program MP where the optical disk is removed (unmounted) from the access position of an optical disk recording and/or reproduction unit.
Figure 10A:
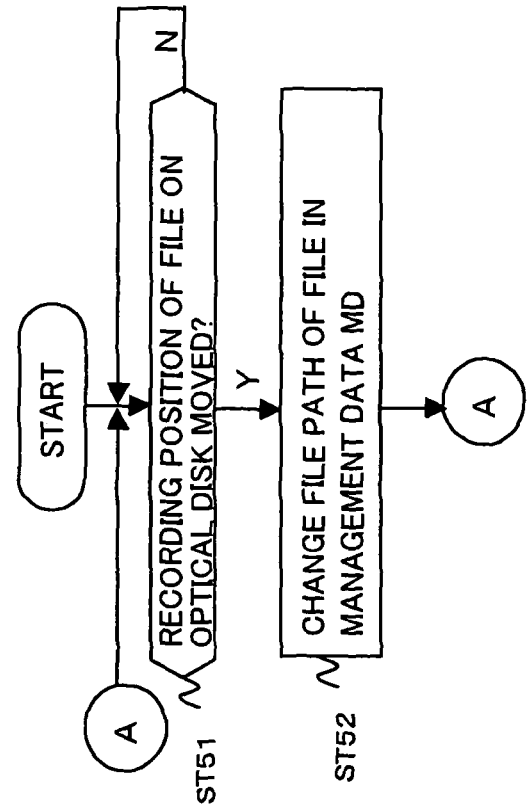
FIG. 10A is a flow chart for explaining the processing by the management program MP where a recording position of the AV file data FILE moves on the optical disk.

FIG. 10A is a flow chart for explaining the processing by the management program MP when the recording position of the AV file data FILE moves on the optical disk 13.

Step ST51:
The management program MP decides whether or not the recording position of the AV file data FILE moved on the optical disk 13. When deciding that it moved, the processing routine proceeds to the processing of step ST52. When not so, the processing of step ST51 is repeated.

Step ST52:
The management program MP changes the file path FP of the AV file data FILE decided to have moved at step ST51 in the management data MD shown in FIG. 4 to the file path FP after the movement.

Thereafter, the management program MP returns to the processing of step ST51.

Example of Fifth Operation

FIG. 10B is a flow chart for explaining the processing by the management program MP when the optical disk 13 is removed (unmounted) from the access position of the optical disk recording and/or reproduction unit 12.

Step ST61:

The management program MP decides whether or not the instruction of removing (unmounting) the optical disk 13 from the access position of the optical disk recording and/or reproduction unit 12 was issued. When deciding that this instruction was issued, the processing routine proceeds to the processing of step ST62. When not so, the processing of step ST61 is repeated.

Step ST62:

The management program MP writes the management data MD after the update to the optical disk 13 before unmounting when the management data MD shown in FIG. 4 was updated.

Thereafter, the unmount of the optical disk 13 is carried out.

As explained above, according to the optical disk device 4, by interposing the management program MP between the application program AP and the file system program FSP, in response to the request REQ designating the data UMID from the computer 3, the file path to the AV file data FILE recorded on the optical disk 13 under the management by the UMID can be provided.

Due to this, the computer 3 can adequately access the AV file data FILE corresponding to the data UMID recorded on the optical disk 13 by not designating the file path in the request REQ, but designating only the data UMID.

Further, according to the optical disk device 4, by updating the management data MD for by recording of a new AV file data FILE to the optical disk 13, deletion of the AV file data FILE from the optical disk 13, and movement of the AV file data FILE on the optical disk 13, access to the AV file data FILE corresponding to the update in accordance with a request REQ designating the UMID can be guaranteed even after that.

Further, according to the optical disk device 4, the management data MD is recorded on the optical disk 13. Whenever the optical disk 13 is set at the access position, the management data MD is read out from the optical disk 13, and the name solution, based on the data UMID mentioned above is carried out. Therefore, even where the optical disk 13 is used in a plurality of optical disk devices, the name solution based on the data UMID mentioned above can be suitably carried out. Namely, the method of designating the file data directly by the file path name is general, but in the case of the a removable medium like an optical disk 13, it is necessary to learn in advance which medium the file data is on. There also exists a case where different AV materials are recorded on different media by the same file path. The optical disk device 4 can even handle such a case.

The present invention is not limited to the above embodiment.

In the above embodiment, the UMID standardized by the SMPTE was illustrated as the identification data of the present invention, but the identification data of the present invention is not particularly limited so far as the identification data identifies each material data among the material data under the predetermined material management.

Further, in the above embodiment, an optical disk was illustrated as the recording medium of the present invention, but the recording medium of the present invention may be a flexible disk, a magnetic disk of a HDD (Hard Disk Drive), or recording media other than them too.

As explained above, according to the present invention, there can be provided a data processing method capable of providing an access path to material data corresponding to identification data designated with respect to the recording medium recording the identification data for identifying each material data among the material data under predetermined material management and the material data linked together, in response to a request designating the identification data, and an apparatus and program of same.

INDUSTRIAL APPLICABILITY

The present invention can be applied to a data processing system for managing material data recorded on recording media.

The invention claimed is:

1. A data processing method comprising:
reading, by a computer processor, a removable recording medium containing management data set at an access position, the management data linking a globally unique identifier and an access path together, the globally unique identifier uniquely identifying a material data and the access path indicating the path on the removable recording medium to the material data;
notifying, by a computer processor, a remote network location that the removable recording medium is set at the access position when it is determined that the management data has linked the globally unique identifier with the access path;
accessing the removable recording medium at the access position; and
providing said access path in response to a request designating said globally unique identifier from the remote network location.

2. A data processing method as set forth in claim 1, further comprising:
updating said management data when new material data and a new globally unique identifier of said new material data are recorded on said removable recording medium, the updating step including linking the new globally unique identifier and new access path to said new material data in said removable recording medium and
writing said updated management data on said removable recording medium.

3. A data processing method as set forth in claim 1, further comprising:
deleting management data linking a globally unique identifier and access path corresponding to a deleted material data when the deleted material data is deleted from said removable recording medium, and generating new management data after the deleted material data has been deleted from said removable recording medium, and
writing said new management data generated in said deleting step on said removable recording medium.

4. The data processing method of claim 1, wherein the removable recording medium is an optical disk.

5. A data processing method executed by a computer based on an application program, a management program, and a file system program, comprising:
reading, by a computer processor, a removable recording medium containing management data set at an access position, the management data linking a globally unique identifier and an access path together, the globally unique identifier uniquely identifying a given material data in the removable recording medium;

notifying, by a computer processor, a remote network location that the removable recording medium is set at the access position when it is determined that the management data has linked the globally unique identifier with the access path;

accessing the removable recording medium at the access position;

issuing a request designating said globally unique identifier, by said application program at the remote network location to said management program;

providing said access path, to said file system program, in response to said request, said access path corresponding to said designated globally unique identifier contained in said management data; and accessing, by the file system, said material data stored at a physical address of said removable recording medium, based on said access path.

6. The data processing method of claim 5, wherein the removable recording medium is an optical disk.

7. A non-transitory computer-readable memory including program code stored thereon, the program code being executable to perform operations comprising:

reading a removable recording medium containing management data set at an access position, the management data linking a globally unique identifier and an access path together, the globally unique identifier uniquely identifying a given material data and the access path indicating the path to the given material data in the removable recording medium;

notifying a remote network location that the removable recording medium is set at the access position when it is determined that the management data has linked the globally unique identifier with the access path;

accessing the removable recording medium at the access position; and providing said access path in response to a request, from the remote network location, designating said globally unique identifier.

8. The data processing program of claim 7, wherein the removable recording medium is an optical disk.

9. A data management hardware apparatus comprising:

a reading means that reads a removable recording medium containing management data set at an access position, the management data linking a globally unique identifier and an access path together, the globally unique identifier uniquely identifying a given material data and the access path indicating the path to the given material data in the removable recording medium;

a notifying means that notifies a remote network location that the removable recording medium is set at the access position when it is determined that the management data has linked the globally unique identifier with the access path;

an accessing means that accesses the removable recording medium at the access position; and a providing means that provides said access path in response to the request, from the remote network location, designating said globally unique identifier.

10. The data management apparatus of claim 9, wherein the removable recording medium is an optical disk.

* * * * *